Oct. 19, 1965  E. A. MILLER  3,212,865
COMPOSITE ELECTRICALLY CONDUCTIVE SPRING MATERIALS
Filed June 13, 1962
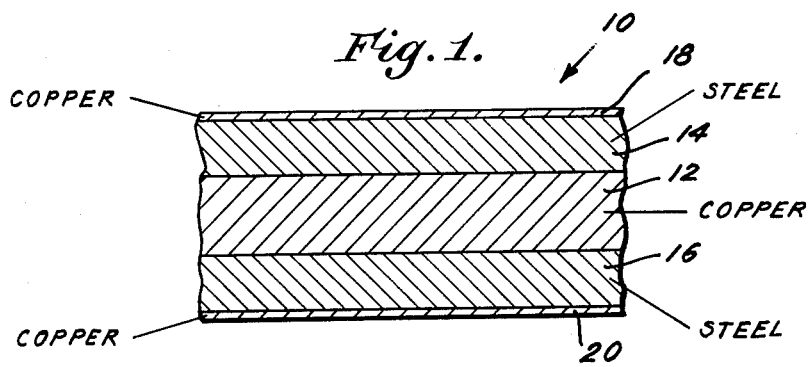
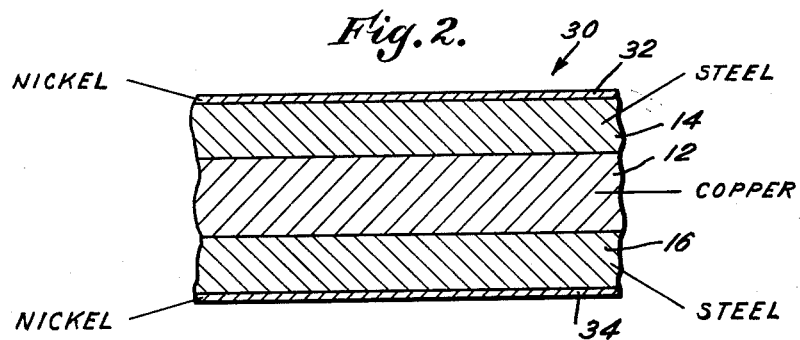
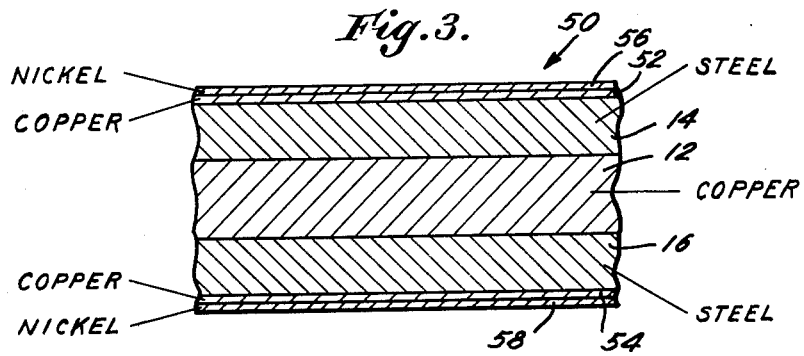
Inventor,
Edwin A. Miller,
by Harold Levine
Atty.

United States Patent Office 3,212,865
Patented Oct. 19, 1965

3,212,865
COMPOSITE ELECTRICALLY CONDUCTIVE
SPRING MATERIALS
Edwin A. Miller, Attleboro, Mass., assignor to Texas Instruments Incorporated, Dallas, Tex., a corporation of Delaware
Filed June 13, 1962, Ser. No. 202,235
6 Claims. (Cl. 29—196.3)

This invention relates to new and improved composite metals and with regard to certain more specific features to new and improved electrically conductive spring materials.

Among the several objects of the invention may be noted the provision of new and improved composite electrically conductive spring materials useful for spring components in such devices as fuseclips, electrical connectors, rheostats, thermostats and other purposes; the provision of such materials which are low-cost and possess required ductility for extreme forming; the provision of such materials which have good corrosion resistance and which afford the combined advantages of good spring characteristics, as well as high electrical conductivity; and the provision of such materials which provide good weldable surfaces to facilitate electrical connection and mounting of components made therefrom.

Other objects and features will be in part apparent and in part pointed out hereinafter.

The invention accordingly comprises the elements and combinations of elements, ingredients and combinations of ingredients, features of construction, composition and arrangement of parts which will be exemplified in the construction and products hereinafter described, and the scope of which will be indicated in the following claims.

In the accompanying drawings, in which several of the various possible embodiments of the invention are illustrated:

FIG. 1 is an enlarged diagrammatic cross section of a bonded material according to one form of the new product; and FIGS. 2 and 3 are diagrammatic cross sections similar to FIG. 1, showing alternative forms of the new product.

Similar reference characters indicate corresponding parts throughout the several views of the drawings.

Dimensions of certain of the parts as shown in the drawings may have been modified and/or exaggerated for the purposes of clarity of illustration.

Referring now to FIG. 1 of the drawings, there is shown at numeral 10 a five-layered composite material according to a first form of the invention. Material 10 comprises a centrally located copper layer 12 sandwiched between and metallurgically bonded to a pair of steel layers 14 and 16, and a pair of comparatively thin, exposed copper layers 18 and 20, each coating and metallurgically bonded to a respective one of said steel layers 14 and 16. Steel layers 14 and 16 are formed of quench hardenable carbon spring steel or quench hardenable low allow (as distinguished from high alloy steel) spring steel. The quench hardenable spring steel is preferably a medium type carbon steel, e.g., S.A.E. 1020 to 1090 carbon steel or an alloy carbon steel, for example, an A.I.S.I. 6150 alloy steel. S.A.E. 1020 to 1090 carbon steel is an alloy having the approximate composition by percentage weight of 0.17% to 1.00% carbon; 0.30% to 1.65% Mn.; 0.040% (max.) P; 0.050% (max.) S; and the remainder iron. A.I.S.I. 6150 alloy steel is a low alloy steel having the approximate composition by percentage weight of 0.48% to 0.53% carbon; 0.70% to 0.90% Mn.; 0.040% (max.) P; 0.040% (max.) S; 0.20% to 0.35% Si.; 0.80% to 1.10% Cr.; 0.15% (min.) vanadium; and the remainder iron.

Each of layers 12, 14, 16, 18 and 20 are solid-phase bonded to each other. The term "solid-phase bonding" means bonding under pressure according to methods described, for example, in U.S. Patents Nos. 2,691,815 and 2,753,623, according to which no liquid phase occurs during the bonding process.

By way of example, material 10 may range in thickness from 0.005 to 0.070 inch. Material 10 may be of any desired width, a suitable example being 6 inches.

For optimum results, it is preferred that the composite material 10 have a relative layer thickness ratio (expressed in terms of percent of over-all composite thickness) as follows:

| | Percent |
|---|---|
| Copper layer 12 | 35–45 |
| Steel layer 14 | 23–33 |
| Steel layer 16 | 23–33 |
| Copper layer 18 | 1– 3 |
| Copper layer 20 | 1– 3 |

A typical nominal ratio expressed in per cent of composite thickness within this optimum range, for the copper layer 18, steel layer 14, copper layer 12, steel layer 16, and copper layer 20, respectively, is 2½%–28%–39%–28%–2½%.

Among the important characteristics and advantages of material 10 may be noted its high strength and electrical conductivity. Material 10 has a substantially lower density, a higher modulus of elasticity, and greater fatigue strength than that generally available in commonly used nonferrous type electrically conductive spring materials and because of the lower density of material 10, more parts per pound can be fabricated, thus presenting a material savings which in many cases is substantial. Another advantage of the material 10 is that it can be annealed, heat treated, resistance spot welded, formed, sheared, or bent for fabrication substantially without damage of the solid-phase bond between the layers. Material 10 advantageously combines the strength and the spring characteristics of the steel components 14 and 16 with the comparatively high electrical conductivity of the copper component 12. The relatively thin outer exposed copper layers 18 and 20 serve a multiple function of providing (1) a corrosion resistant surface, (2) a good weldable surface for effecting low resistance electrical connections thereto, and (3) a carbon migration barrier to prevent decarburization of the steel components 14 and 16 which might otherwise take place when material 10 is heat treated, e.g., for annealing, hardening, or hot forming, etc. An advantage of the decarburization preventing action of the copper layers 18 and 20 is that the composite material can be heat treated without the necessity of controlled atmosphere which would otherwise be required to control or minimize decarburization of the steel layers. Layers 18, 14, 12, 16, and 20 of material 10 are substantially symmetrical in cross section with the relatively thick, comparatively weaker copper component 12, centrally located which gives the advantage of eliminating or at least minimizing thermal deflection when material 10 is subjected to elevated temperature. While the relatively soft copper layer 12 is comparatively thick, it has been found that its influence on the elastic behavior of the composite 10 is relatively minor which is believed due to its central location within the composite material, i.e., at the neutral axis region of lowest stress under loading conditions in bending.

Table I below provides comparison of some representative properties and characteristics (with typical values) between material 10 and typical examples of conventional nonferrous electrically conductive spring materials.

TABLE I

| Properties | Hardened Material 10, Quenched 1,600° F., Tempered 600° F. | Be Copper #25 Alloy* Annealed, Heat Treated | Be Copper #10 Alloy,** Mill Hardened |
|---|---|---|---|
| Yield strength [1] in bending, p.s.i. | 200,000 | 140,000 | 86,000 |
| Yield strength in tension, p.s.i. | 133,000 | 130,000–150,000 | |
| Ultimate strength in tension, p.s.i. | 145,000 | 165,000–180,000 | 120,000 |
| Elongation, percent in 2" | 4–5 | 4–10 | 3–8 |
| Modulus of Elasticity, p.s.i. | [2] 23×10⁶ | 19×10⁶ | 18.5×10⁶ |
| Electrical Resistiv., ohm/cir. mil. ft. | 22–23 | 34–47 | 21 |
| Electrical Conductivity, percent IACS | 44–45 | 22–30 | 48 |
| Thermal Conducrivity, B.t.u./sq. ft./in./° F./Hr. | [3] 520–1,220 | 750–900 | 1,450–1,800 |
| Thermal Expansion Coeff., In./In.,° F. | 7.4×10⁻⁶ | 9.3×10⁻⁶ | 9.8×10⁻⁶ |
| Max. Service, Temp., ° F. | about 300 | about 300 | about 400 |
| Magnetic Characteristics | Magnetic | Non-Mag. | Non-Mag. |
| Fatigue Strengths, p.s.i. | [4] 54,000 | 35,000–45,000 | 35,000 |

[1] Determined under loading in bending. Yield criterion in bending is based on a specific change in slope of the stress-strain curve. Yield strength is the unit stress at which the stress-to-strain ratio has decreased to ¾ of the linear stress-to-strain ratio.
[2] Measured in bending.
[3] Computed, lower value is normal to surface; higher, parallel.
[4] Based on 10,000,000 cycles—strip in reverse bending.
Data on other than composite materials taken from published literature, except yield strength in bending.
*BeCu #25 is an alloy having the nominal composition of approximately 2.00% beryllium, 0.3% cobalt and remainder copper.
**BeCu #10 is an alloy having the nominal composition of approximately 0.5% beryllium, 2.5% cobalt and the remainder copper.

Material 10 can be hardened by a relatively short and simple heat treatment. An example of a suitable heat treating procedure is heating the composite uniformly to a temperature of 1575° F. to 1600° F., and holding this temperature until the entire batch of material is at this temperature for a period of 2 to 5 minutes. Thereafter the material is quenched in oil or other appropriate media. After the parts have cooled to room temperature, they should be tempered for a period of about a minimum of a half hour at a temperature which will result in the desired final hardness. The manner of cooling from the tempering heat is unimportant. Average hardness versus typical tempering temperatures is indicated in Table II below.

TABLE II

| Tempering temperature: | Hardness, Rockwell "C" |
|---|---|
| As quenched | 55–61 |
| 600 | 50 |
| 700 | 48 |
| 800 | 45 |
| 900 | 42 |
| 1000 | 40 |

In contrast to the above, conventional nonferrous type electrically conductive spring materials, for example, beryllium-copper, usually require commercially undesirable lengthy heat treatments for hardening purposes, which often times are also complex and difficult to control.

The mechanical properties of material 10 as heat treated are the same whether hardened from material originally in an annealed condition or cold rolled temper. Optimum properties of material 10 do not depend on previous cold work, as is the case with precipitation hardening alloys. This advantageously permits fabrication of material 10 in a condition of maximum formability without sacrifice of ultimate properties.

In FIG. 2 is shown another product generally referred to by numeral 30 according to another form of the invention. Composite 30 differs from material 10 in the employment of two nickel layers 32 and 34 as the exposed outer layers in place of copper layers 18 and 20. The optimum thickness ratios between the layers and the exemplary thickness mentioned above for material 10 apply also to material 30. The nickel layers 32 and 34 preferably should have substantially the same thickness as that mentioned above for the copper layers 18 and 20 in material 10.

I have found that the nickel layers 32 and 34 are substantially equivalent to the copper layers 18 and 20 of material 10 in that the nickel layers protect the hardenable spring type carbon steel layers against decarburization (when the composite is subject to heat treatments at elevated temperatures), provide a corrosion resistant surface and a good weldable surface for low resistance electrical connections. I have also found that the nickel layers have better welding characteristics than the copper layers but are not as effective as the copper layers in preventing decarburization of the steel layers 14 and 16.

The FIG. 3 form of the product combines the good weldable characteristics of nickel and carbon barrier advantages of copper in a seven-layered composite material generally referred to by numeral 50. Composite 50 like materials 10 and 30 includes a comparatively thick central layer of copper 12 sandwiched between two steel layers 14 and 16. The steel layers 14 and 16 are each respectively coated with a relatively thin layer of copper 52 and 54. Each of copper layers 52 and 54 are in turn respectively coated with a layer of nickel 56 and 58. Each of the seven layers comprising the composite material 50 are solid-phase bonded together. In the FIG. 3 embodiment, it is preferred that each of the copper layers 52, 54 and nickel layers 56, 58 have approximately one half the thickness mentioned for the respective corresponding exposed copper and nickel layers in the embodiments of FIGS. 1 and 2. The thickness ratios (including those for optimum results) mentioned above for the copper layer 12 and the steel layers 14 and 16 in the embodiments of FIGS. 1 and 2, also applies to the embodiment of FIG. 3.

Material 50 provides substantially all of the advantages described above in connection with materials 10 and 30 and additionally combines the advantages of the superior weldable surface of the nickel layers and the superior carbon barrier characteristics of the copper layers to prevent decarburization of the steel layers.

Dimensions of the layers need not always be precisely those above given. The dimensions can be selected so that the outer copper layers 18 and 20 or nickel layers 32 and 34 are relatively thin and that the central copper layer 12 be relatively thick. It is preferred that the outer copper layers 18, 20 and 52, 54 and nickel layers 32, 34 and 56, 58 be at a minimum so as to avoid any significant influence or damping of the spring action of the composite, but thick enough to assure that the steel surfaces are completely covered.

The following examples illustrate the invention:

Example 1

A five-layered composite material such as shown in FIG. 1 was bonded with the layers having the following final thickness ratios (based on percentage of the overall composite thickness):

| | Percent |
|---|---|
| Copper layer | 18–2½ |
| Steel layer | 14–28 |
| Copper layer | 12–39 |
| Steel layer | 16–28 |
| Copper layer | 20–2½ |

A six inch wide continuous strip of copper with a starting thickness of 0.008 inch and a six inch wide continuous strip of A.I.S.I. 6150 alloy steel with a starting thickness of 0.078 inch was used. These strips were cleaned on their surfaces to be bonded to remove gross contaminants and barriers to bonding as described in the aforementioned Patent 2,691,815, and were then squeezed together (by rolling) to a combined thickness of 0.035 inch to green bond the strips. The green bonded two-layered composite was then sintered in a bell furnace at a temperature of approximately 1200° F. for about two hours to perfect and increase the bond strength between the layers. This procedure was repeated for another pair of copper and steel strips. The exposed steel surfaces of the two copper-steel bonded composites were then cleaned (as described in the aforementioned 2,691,815 patent). Thereafter the two bonded composites were assembled with a six inch wide cleaned copper strip having a starting thickness of 0.044 inch and sandwiched between the steel layers. This assembly was then squeezed (by rolling) to a reduced over-all composite thickness of 0.045 inch. The resulting green bonded assembly was then sintered in a bell furnace at a temperature of 1200° F. for two hours to perfect and increase the bond strength. This resulted in a strongly solid-phase bonded five-layered composite. The composite was thereafter cleaned and rolled to a finish gauge of 0.020 inch.

*Example 2*

Example 2 is substantially the same as Example 1 and was made by the method described in Example 1. Example 2 differs from Example 1 only in that the 0.045 inch thick bonded composite was roll reduced to a final gauge of 0.010 inch which was accomplished by a plurality of cumulative rolling passes and intermediate annealing steps. The intermediate annealing steps consisted of a continuous strip anneal at a temperature of 1370° F.

*Example 3*

This example is substantially the same as Example 1 except that nickel was employed for the outer exposed layers instead of copper and the steel layers 14 and 16 were A.I.S.I. 1065 carbon steel instead of the 6150 alloy steel.

*Example 4*

A five-layered composite such as shown in FIG. 1 having the final layer thickness ratios of Example 1 was bonded. Two continuous copper strips having a starting thickness of 0.007 inch, two continuous A.I.S.I. 6150 alloy steel strips having a starting thickness of 0.078 inch, and a centrally located continuous copper strip having a starting thickness of 0.109 inch were assembled in the order as shown in FIG. 1. These layers were cleaned on their surfaces to be bonded in the manner described in the Boessenkool et al. 2,691,815 patent mentioned above. All five layers were then assembled and bonded simultaneously in line, by roll squeezing the composite to a reduced over-all composite thickness of 0.100 inch. The composite after one rolling pass had a strong enough green bond to permit continuous strip annealing and sintering of the composite to perfect the bond. This combined continuous strip annealing and sintering step was performed in a horizontal furnace at a temperature of 1375° F. The bonded composite was then further reduced to an intermediate gauge of 0.050 inch in thickness by a plurality of cumulative rolling passes. Thereafter the composite strip was edge trimmed and rolled to a finished gauge of 0.025 inch. The finish gauge rolling was accomplished with a plurality of alternate rolling and intermediate continuous strip annealing steps at a temperature of 1375° F.

While it is preferred that the relatively thin outer copper layers 18, 20 and 52, 54 and nickel layers 32, 34 and 56, 58 be solid-phase bonded, it will be understood that these layers can be coated on the respective steel layers by other convenient methods, e.g., electroplating, vapor deposition, etc., within the purview of this invention.

It will be seen that the several objects of the invention are achieved and that other advantageous results are obtained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. Composite electrically conductive spring material comprising a plurality of solid-phase bonded metallic layers comprising a centrally located copper layer sandwiched between a pair of layers formed of a material selected from the group consisting of hardenable carbon spring steel and hardenable low alloy spring steel and a pair of exposed layers selected from the group consisting of copper and nickel, each coating a respective one of said steel layers; said centrally located copper layer comprising approximately 35–45% of the overall thickness of said composite material; each of said steel layers comprising approximately 23–33% of the overall thickness of said composite material and each of said pair of exposed layers comprising approximately 1–3% of the overall thickness of said composite material.

2. The composite material as set forth in claim 1 and wherein the overall thickness of said composite material is on the order of 0.005–0.070 inch.

3. The composite material as set forth in claim 1 and wherein said centrally located copper layer comprises approximately 39% of the overall thickness of the composite material, each of said steel layers comprises approximately 28% of the overall thickness of the composite material and each of said exposed layers comprises approximately 2½% of the overall thickness of the composite material.

4. Electrically conductive spring material comprising a plurality of solid-phase bonded metallic layers at least five of which layers comprise copper, steel, copper, steel and copper in that order, said steel layers being formed of a hardenable low alloy spring steel having the approximate composition of 0.48% to 0.53% carbon; 0.70% to 0.90% Mn.; 0.040% (max.) P; 0.040% (max.) S; 0.20% to 0.35% Si.; 0.80% to 1.10% Cr.; 0.15% (min.) V; and the remainder iron.

5. Composite electricaly conductive spring material comprising a plurality of solid-phase bonded metallic layers comprising a centrally located copper layer sandwiched between a pair of layers formed of a material selected from the group consisting of hardenable carbon spring steel and hardenable low alloy spring steel, a pair of copper layers each coating a respective one of said steel layers, and a pair of nickel layers each coating a respective one of said copper layers; said centrally located copper layer comprising approximately 35–45% of the overall thickness of said composite material; each of said steel layers comprising approximately 23–33% of the overall thickness of said composite material, said copper layers comprising approximately 1–3% of the overall thickness of said composite material and said nickel layers comprising approximately 1–3% of the overall thickness of said composite material.

6. The composite material as set forth in claim 5 and wherein the overall thickness of said composite material is on the order of 0.005–0.070 inch.

References Cited by the Examiner

UNITED STATES PATENTS

| | | | | |
|---|---|---|---|---|
| 967,146 | 8/10 | Simpson | 29—196.3 |
| 1,077,977 | 11/13 | Fuller | 29—196.3 |
| 1,972,524 | 9/34 | Kinzel | 75—126 |
| 2,020,477 | 11/35 | Scott | 29—196.3 X |
| 2,059,584 | 11/36 | Johnson. | |
| 2,214,002 | 9/40 | Trainer | 29—196.3 X |
| 2,474,038 | 6/49 | Davignon | 29—196.6 X |
| 2,479,053 | 8/49 | Adams | 29—196.3 |
| 2,558,093 | 6/51 | Kinney | 29—196.3 X |
| 2,691,815 | 10/54 | Boessenkool | 29—194 |
| 3,112,185 | 11/63 | Ochsner | 29—196.3 |

DAVID L. RECK, *Primary Examiner.*

HYLAND BIZOT, *Examiner.*